United States Patent [19]
Tamachi et al.

[11] 3,957,471
[45] May 18, 1976

[54] EXHAUST GAS PURIFIER

[75] Inventors: Yoshihiro Tamachi; Yukio Kanzaki; Kazunori Hondo; Shigeru Uchida, all of Tokyo, Japan

[73] Assignee: Hoei Kogyo Kabushiki Kaisha, Tokyo, Japan

[22] Filed: Dec. 5, 1974

[21] Appl. No.: 529,780

[30] Foreign Application Priority Data
Dec. 21, 1973    Japan.................. 48-145738[U]

[52] U.S. Cl.............................. 55/396; 55/337; 55/413; 55/426; 55/455; 55/457; 55/DIG. 20; 55/DIG. 30; 110/119
[51] Int. Cl.²................. B01D 45/12; B01D 50/00
[58] Field of Search.......... 55/391, 394, 396, 337, 55/426, 455, 458, 466, DIG. 20, 425, DIG. 30, 449, 450, 413, 414, 456, 457, 319; 110/119; 60/311

[56] References Cited
UNITED STATES PATENTS

| | | | |
|---|---|---|---|
| 1,037,326 | 9/1912 | Roether | 55/DIG. 20 |
| 1,715,549 | 6/1929 | Hawley | 55/396 |
| 2,449,790 | 9/1948 | Sebald | 55/457 |
| 2,560,072 | 7/1951 | Bloomer | 55/455 X |
| 2,709,501 | 5/1955 | Toth et al. | 55/455 X |
| 2,732,032 | 1/1956 | Sandison | 55/450 X |
| 2,925,884 | 2/1960 | Campbell | 55/455 X |
| 3,009,539 | 11/1961 | Papp | 55/466 X |
| 3,374,857 | 3/1968 | Hutchins | 55/396 X |
| 3,545,179 | 12/1970 | Nelson et al. | 55/426 X |
| 3,698,875 | 10/1972 | Yamada | 60/311 X |
| 3,815,339 | 6/1974 | Meier et al. | 55/455 X |

Primary Examiner—Charles N. Hart
Assistant Examiner—David L. Lacey
Attorney, Agent, or Firm—Frank J. Jordan

[57] ABSTRACT

An exhaust gas purifier for removing unburned solid particles, sparks, and flames contained in exhaust gas discharged from internal and external combustion engines includes a closed cylindrical member connected to the exhaust port of an internal or external combustion engine and a swirl-generating member disposed in the cylindrical member and provided with a plurality of swirl vanes for swirling the exhaust gas, whereby the length of time that the exhaust gas is disposed in the cylinder is extended and unburned solid particles, sparks, and flames contained in the exhaust gas are centrifugally separated and extinguished thereby discharging relatively clean gas.

7 Claims, 9 Drawing Figures

EXHAUST GAS PURIFIER

BACKGROUND OF THE INVENTION

This invention relates to an exhaust gas purifier and, more particularly, to an exhaust gas purifier for use in internal or external combustion engines of motor vehicles and ships. More particularly, the exhaust gas purifier of the present invention is adapted to completely extinguish sparks and, in addition, to finely granulate and discharge solid exhaust particles after they have been extinguished and collected.

If unburned solid particles, solid particles in the form of sparks, or flames are discharged into the atmosphere from exhaust pipes of large-sized vehicles such as trailers or from smoke stacks of ships such as tankers, they will adversely affect the environment and cause pollution. Discharge of sparks or flames from the smokestack of a tanker into the atmosphere is particularly dangerous because it is liable to cause ignition of the petroleum products carried on the tanker. For this reason, it is necessary that a smokestack of a ship or the like should be provided with a filter screen for preventing discharge of sparks. However, a satisfactory preventive effect cannot be expected by the provision of a filter screen alone.

Accordingly, it has heretofore been proposed to provide a method in which the exhaust gas containing the sparks is made to swirl in the extension of a stack or in the exhaust pipe to thereby extinguish the sparks. However, a conventional swirling method has disadvantages in that it cannot completely extinguish the sparks and, in addition, it cannot remove relatively large-sized unburned particles contained in the exhaust gas.

Accordingly, it is an object of the present invention to overcome the disadvantages of known prior art arrangements and to provide an exhaust gas purifier which can discharge an exhaust gas after extinguishing the sparks in the exhaust gas, which can finely granulate unburned solid particles into fine dust, and which can be safely used as an exhaust gas purifier for internal or external combustion engines of motor vehicles, ships, and the like.

Another object of the present invention is to provide an exhaust gas purifier which can be very easily mounted on an exhaust pipe of a motor vehicle or the like or on a smokestack of a ship such as a tanker and which can remove sparks, flames, and unburned solid particles from the exhaust gas.

According to the present invention, there is provided an exhaust gas purifier comprising a closed cylindrical member which can be mounted on an exhaust pipe of a motor vehicle, on a stack of a ship, or a similar location and which has at its one end an exhaust gas inlet and at the other end an exhaust gas outlet. A cap-shaped cylindrical swirl-generating member is fixed in the closed cylindrical member so that it will cover the exhaust gas inlet and is provided with a plurality of swirl vanes for imparting a swirling motion to the exhaust gas in the closed cylindrical member, whereby, while the exhaust gas is made to swirl through the inside of the closed cylindrical member by the swirl-generating member and is discharged from the exhaust gas outlet, sparks contained in the exhaust gas are extinguished and unburned solid particles are collected in the closed cylindrical member for discharge through the exhaust gas outlet.

According to another aspect of the present invention, the exhaust gas purifier may also be provided with a filter means or screen for preventing discharge of sparks or flames into the atmosphere.

According to still another aspect of the present invention, the swirl-generating member may have on its wall a swirl guide projection extending into the closed cylindrical member towards the exhaust gas outlet, thereby ensuring a more stable swirling action of the exhaust gas in the closed cylindrical member to further improve purification of the exhaust gas.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

SUMMARY OF THE INVENTION

An exhaust gas purifier comprises a closed cylindrical member having an exhaust gas inlet conduit at one longitudinal end and an exhaust gas outlet conduit at the other longitudinal end. A swirl-generating means is disposed in the cylindrical member surrounding an outlet portion of the inlet conduit. The swirl-generating means is provided with a plurality of swirl vanes having passages therebetween, whereby exhaust gas introduced into the cylindrical member through the inlet conduit is made to swirl by the swirl-generating member, thereby extending the length of time that the exhaust gas is disposed in the cylindrical member and centrifugally separating solid particles in the exhaust gas including sparks and discharging relatively clean gas in a central flow portion of the exhaust gas through the outlet conduit.

DESCRIPTION OF THE PREFERRED EMBODIMENTS

Figure 1:
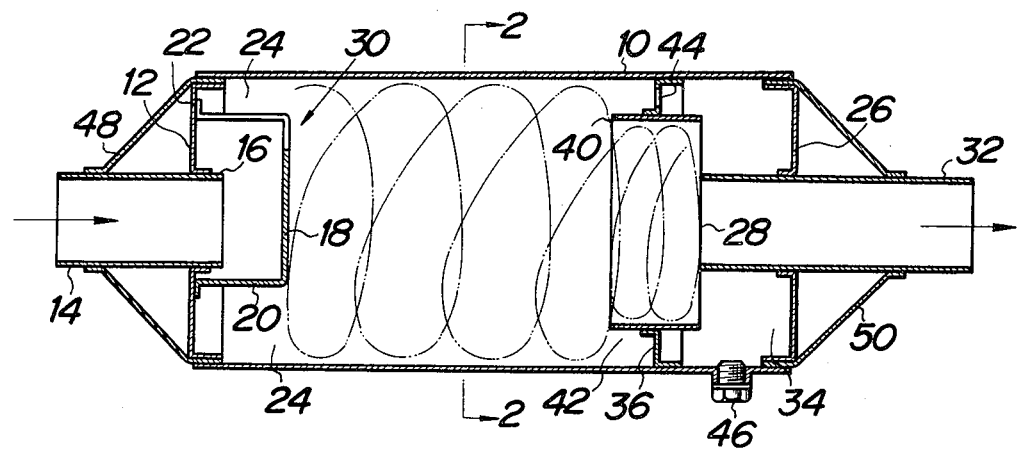
FIG. 1 is a longitudinal mid-sectional view of an exhaust gas purifier according to one embodiment of the present invention.
Figure 2:
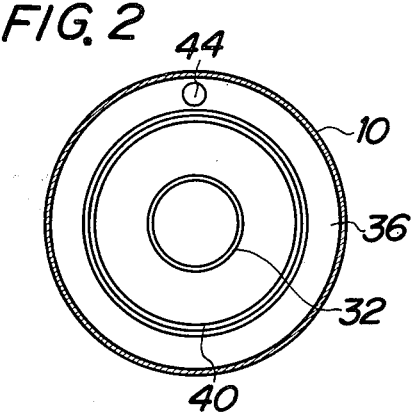
FIG. 2 is a longitudinal sectional view taken along the line 2—2 in FIG. 1.
Figure 3:
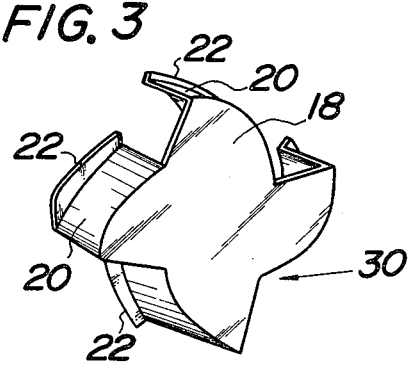
FIG. 3 is a perspective view of a swirl-generating member viewed from the rear thereof for deflecting and swirling exhaust gas in the exhaust gas purifier according to the present invention.

The present invention will now be described with reference to the accompanying drawings. In FIGS. 1, 2, and 3, especially in FIG. 1, there is shown an exhaust gas purifier according to one embodiment of the present invention and having a horizontally disposed closed cylinder 10 provided with a front end plate 12. An inlet pipe 14 is inserted in the cylinder 10 through the front end plate 12 with the rear end 16 thereof projecting into the cylinder 10 a predetermined length. A swirl-generating member 30 surrounds the rear end 16 of the inlet pipe 14 and comprises a shield plate 18 and a plurality of deflecting vanes 20 formed along the periphery of the shield plate 18 and extending in the same direction at a right angle to the surface thereof in the form of an arrow wheel having a maximum diameter considerably smaller than the inside diameter of the cylinder 10. The swirl-generating member further includes fixing portions 22 formed by externally bending the ends of the respective vanes 20 at right angles relative thereto for fixing the swirl-generating member 30 to the rear surface of the front end plate 12. As shown in FIG. 1, a primary annular chamber 24 is defined by the outside surfaces of the swirl vanes 20 and the inside surface of the cylinder 10.

The exhaust gas purifier according to the present invention further comprises a rear end plate 26 on the cylinder 10 and an outlet pipe 32 inserted in the cylinder 10 through the end plate 26 with the front end 28 thereof projecting by a predetermined length beyond the end plate 26. A partition plate 36 is positioned in the vicinity of the front end 28 of the outlet pipe 32 for dividing the inside of the cylinder 10 into two parts and is provided with a central opening having a diameter considerably larger than the outside diameter of the outlet pipe 32 along with a through-hole 44 at a suitable position in the vicinity of the periphery thereof. A guide tube 40 extends through the central opening of the partition plate 36. A dust chamber 34 is defined by the rear surface of the partition plate 36, the rear outside surface of the guide tube 40, the front outside surface of the outlet pipe 32 and the rear end plate 26 of the cylinder 10, and a secondary annular chamber 42 is defined by the front surface of the partition plate 36, the front outside surface of the guide tube 40, and the inside surface of the cylinder 10.

In FIG. 1, the numeral 46 designates a plug for a discharge hole provided at the bottom of the dust chamber 34, and the numerals 48 and 50 designate stiffener-covers provided at the front and rear ends of the cylinder 10, respectively.

With the construction as described above, the exhaust gas purifier according to the present invention, when in use, is connected at the front end of the inlet pipe 14 to the exhaust portion of a non-illustrated engine.

In operation, exhaust gas is fed into the cylinder 10 through the inlet pipe 14 and strikes against the shield plate 18. The exhaust gas is thereby scattered in all directions and then is made to swirl by the action of the swirl vanes 20 to pass into the primary annular chamber 24 between the swirl vanes 20 and the internal surface of the cylinder 10. The exhaust gas fed into the primary annular chamber 24 flows through the inside of the cylinder towards the rear end thereof while swirling helically along the inside surface of the cylinder 10.

While the exhaust gas is helically swirling through the cylinder 10, relatively large unburned particles or sparks are joined in the outermost stream of the swirling exhaust gas along the inside surface of the cylinder 10 due to centrifugal force and are fed into the secondary annular chamber 42 defined by the front outside surface of the guide tube 40, the partition plate 36 and the inside surface of the cylinder 10, and then are fed through the through-hole 44 in the partition plate 36 into the dust chamber 34 where the solid particles are collected.

Moreover, substantially all of the sparks in the exhaust gas swirling in the cylinder 10 are extinguished during swirling. Any sparks remaining unextinguished are, while swirling in the secondary chamber 42, completely extinguished and are worn out to become fine particles which are joined in the exhaust gas flow to be discharged into the atmosphere through the outlet pipe 32.

Thus, according to the present invention, while the exhaust gas fed into the cylinder 10 through the inlet pipe 14 is flowing through the purifier, solid particles contained therein are collected in the dust chamber 34 and sparks in the exhaust gas are extinguished. Therefore only the gas contained in the central stream of the swirling exhaust gas flow and free of solid particles and sparks is discharged from the outlet pipe 32 into the atmosphere through the guide tube 40.

In addition, since the exhaust gas is passed by swirling helically through the guide tube 40, fine particles contained therein are fed from the rear end of the guide tube 40 into the dust chamber 34 where they are collected or more finely granulated while they are further kept swirling therein until discharged from the outlet pipe 32 together with the exhaust gas.

Figure 4:
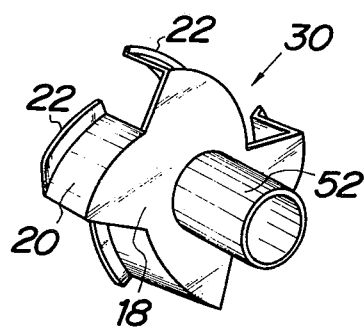
FIG. 4 is a perspective view similar to FIG. 3 showing a modification of the swirl-generating member.
Figure 5:
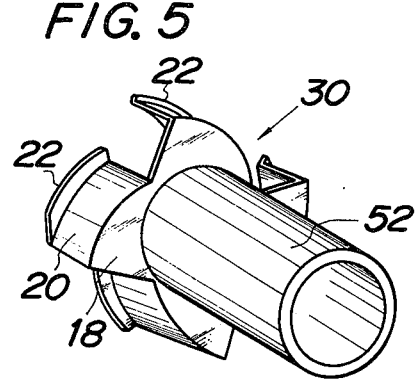
FIG. 5 is a perspective view similar to FIG. 3 showing still another modification of the swirl-generating member.
Figure 6:
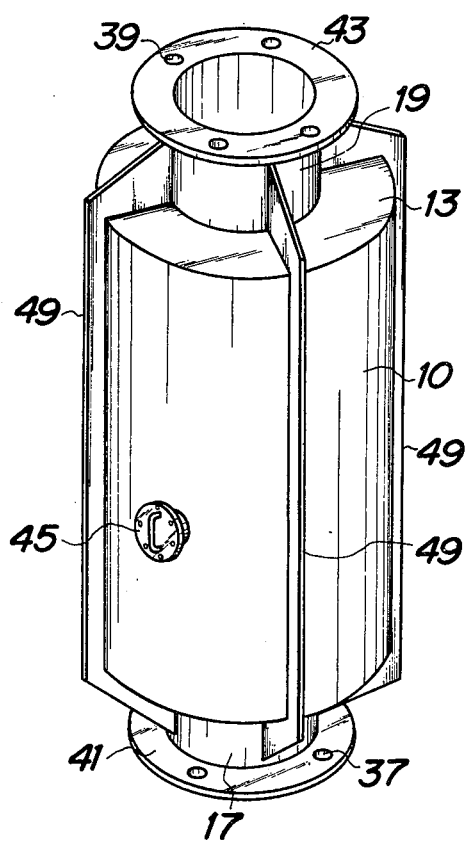
FIG. 6 is a perspective view showing another embodiment of the exhaust gas purifier according to the present invention.
Figure 7:
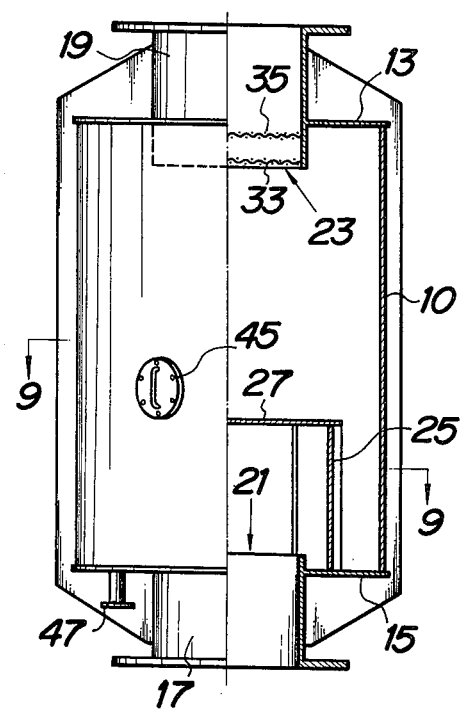
FIG. 7 is a side view, partly in section, of the exhaust gas purifier shown in FIG. 6.
Figure 8:
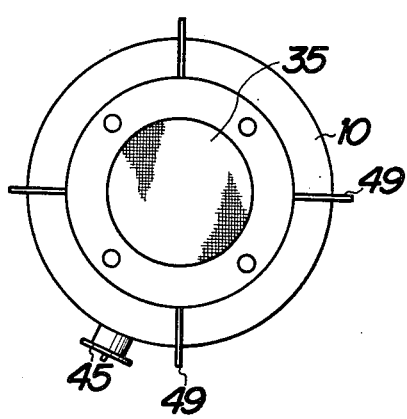
FIG. 8 is a plan view of the exhaust gas purifier shown in FIG. 6.
Figure 9:
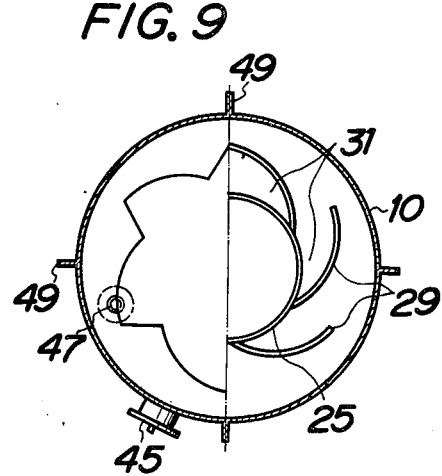
FIG. 9 is a sectional view taken along the line 9—9 of FIG. 7.

FIGS. 4 and 5 show two different modifications of the swirl-generating member 30. In these modifications, the swirl-generating member 30 is provided with a cylindrical or rod-shaped swirl-guiding projection 52 projecting from the center of the rear surface of the shield plate 18. The size of the projection 52 may be suitably selected. For example, the diameter of the projection 52 may be selected so that the projection may be positioned at a short distance from the edge of the shield plate 18 from which each vane 20 is projected, as shown in FIG. 4, or the diameter may be selected so that the projection 52 may be positioned along the edge of the shield plate 18.

The projection 52 is provided for preventing the swirling gas flow from being disturbed and for preventing a part of the sparks and unburned solid particles from gathering in the central portion of the cylinder 10 due to the possible negative pressure which may be otherwise created in the central portion at the rear of the shield plate 18. This negative pressure may be created when the exhaust gas strikes against the shield plate 18 of the swirl-generating member 30 thereby being scattered in all directions and then caused to swirl radially outwardly by the swirl vanes 20 before passing into the primary annular chamber 24 between the swirl vanes 20 and the inside surface of the cylinder 10.

FIGS. 6 to 9 show an embodiment of the purifier of the present invention for use in the smokestacks of ships including tankers and which is suitable for completely extinguishing sparks and flames in exhaust gas. This exhaust gas purifier includes a closed vertical cylinder 10 provided with an upper end plate 13 and a lower end plate 15, an inlet tube 17 inserted in the cylinder 10 through the lower plate 15 for forming an inlet 21, an outlet tube 19 inserted in the cylinder 10 through the upper plate 13 for forming an outlet 23, and a cap-shaped cylindrical swirl-generating member 25 fixed through the open end peripheral surface thereof to the inside surface of the lower plate 15 so that it will cover the inlet 21. The swirl-generating member 25 has a ceiling plate 27 and a plurality of equally spaced swirl vanes 29 having spaces 31 therebetween and having a width equal to the distance between the ceiling plate 27 and the lower end plate 15 and projecting from the outside surface of the swirl-generating member 25. The outlet 23 has double filter screens 33 and 35 removably mounted therein. The inlet tube 17 and the outlet tube 19 are provided at the peripheries of their externally projecting ends with flanges 41 and 43 having fitting holes 37 and 39, respectively. The purifier thus can be mounted at the middle portion of a smokestack of a ship such as a tanker by mating the above-mentioned flanges 41 and 43 with the flanges provided at the end surfaces of the lower and upper halves of a smokestack and then tightening them together by screws and nuts. The numeral 45 designates a peep hole, 47 a drip tube, and 49 stiffeners. Further, the length of the purifier may be, for example, 2.187 mm.

In operation, the exhaust gas discharged through a smokestack of a ship is introduced into the cylinder 10 through the inlet 21 and then strikes against the ceiling plate 27 thereby turning in the lateral direction and then subjected to a swirling action by the swirl-generating member 25 as the gases flow out of the openings 31. The exhaust gas then ascends spirally, swirling through the cylinder 10 to be discharged from the outlet 23 through the filter screens 33 and 35. Meanwhile, sparks and flames in the exhaust gas are substantially completely extinguished due to their impact on the ceiling plate 27, their extended residence time in the cylinder 10 resulting from their swirling movement therein, and their movement towards the inside wall surface of the cylinder 10 caused by the centrifugal force. Any sparks or the like still remaining in the exhaust gas flowing through the outlet 23 are completely extinguished by the filter screens 33 and 35.

It will be understood from the foregoing description that the exhaust gas purifier according to the present invention is very simple in construction and easy to install, can completely remove sparks and flames contained in the exhaust gas, can remove unburned solid particles, and therefore is very effective as an exhaust gas purifier for motor vehicles and ships.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof.

What is claimed is:

1. An exhaust gas purifier comprising a cylindrical member, a front end plate closing one longitudinal end of said cylindrical member, a rear end plate closing the other longitudinal end of said cylindrical member, an exhaust gas inlet conduit passing through an opening in said front end plate and extending into said cylindrical member a predetermined distance beyond said front plate, said inlet conduit having an inlet portion and an outlet portion, a swirl-generating means disposed in said cylindrical member surrounding said outlet portion of said inlet conduit such that a primary annular chamber is formed between the outside surfaces of said swirl-generating means, the inside surface of said cylindrical member, and the inside surface of said front end plate, a partition plate disposed in said cylindrical member for dividing the latter into two parts, said partition plate having a central hole with a diameter larger than the outside diameter of said outlet conduit, said partition plate also having a through-hole at a position disposed radially outwardly of said central hole and radially inward of said cylindrical member, and a guide tube disposed in said central hole of said partition plate, said partition plate being spaced from said rear end plate, whereby said partition plate along with said guide tube, and said cylindrical member define a secondary annular chamber, an outlet conduit passing through an opening in said rear end plate and extending into said cylindrical member a predetermined distance beyond said rear end plate such that the outside surface of said outlet conduit, the rear surface of said partition plate, the inside surface of said rear end plate, and the inside surface of said cylindrical member defines a dust chamber, said swirl-generating means being provided with a plurality of swirl vanes having passages therebetween, whereby exhaust gas introduced into said cylindrical member through said inlet conduit is made to swirl by said swirl-generating means into said primary annular chamber thereby extending the length of time the exhaust gas is in said cylindrical member and centrifugally separating solid particles in the exhaust gas including sparks and discharging relatively clean gas in a central flow portion of the exhaust gas through said outlet conduit as said solid particles pass to said dust chamber.

2. An exhaust gas purifier as set forth in claim 1 wherein said swirl-generating means comprises a shield extending generally transversely of the longitudinal axis of said cylindrical member and arranged generally in alignment with said inlet conduit such that exhaust gas passes from the inlet conduit to impinge on said shield, said swirl vanes extending perpendicularly from said shield and arranged such that the gas which impinges on said shield is directed radially outwardly by said swirl vanes as the latter imparts a swirling action to the exhaust gas.

3. An exhaust gas purifier as set forth in claim 2 including a cylindrical projection extending from said shield into said cylindrical member and toward said outlet tube, said cylindrical projection having a longitudinal axis generally aligned with the cylindrical axis of said cylindrical member.

4. An exhaust gas purifier as set forth in claim 2 wherein said shield has a star-like configuration with a plurality of arcuate peripheral edges, said swirl vanes each having an arcuate cross-sectional configuration corresponding to the arcuate configuration of said peripheral edges, said swirl vanes having arcuate edges coincident with said arcuate peripheral edges of said shield.

5. An exhaust gas purifier as set forth in claim 1 including means on said cylindrical member for removing particles collected in said dust chamber.

6. An exhaust gas purifier as set forth in claim 1 wherein said swirl vanes include lateral flanges to facilitate securing said swirl vanes to said front end plate.

7. An exhaust gas purifier as set forth in claim 1 wherein said guide tube has a diameter larger than the diameter of said outlet conduit, said guide tube having one longitudinal end terminating substantially flush with the inner longitudinal end of said outlet conduit, whereby said one longitudinal terminating end of said guide tube is spaced radially outwardly of said inner longitudinal end of said outlet conduit.

* * * * *